United States Patent
Khawer et al.

(10) Patent No.: US 10,028,161 B2
(45) Date of Patent: Jul. 17, 2018

(54) PERFORMANCE MEASUREMENT COUNTERS FOR UNLICENSED FREQUENCY BANDS

(71) Applicant: Alcatel-Lucent USA, Inc., Murray Hill, NJ (US)

(72) Inventors: Mohammad R. Khawer, Lake Hopatcong, NJ (US); Ruth S. Gayde, Naperville, NJ (US); Padma Sudarsan, Naperville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 82 days.

(21) Appl. No.: 15/139,000

(22) Filed: Apr. 26, 2016

(65) Prior Publication Data
US 2017/0311191 A1 Oct. 26, 2017

(51) Int. Cl.
*H04W 24/10* (2009.01)
*H04W 16/14* (2009.01)
*H04W 24/08* (2009.01)

(52) U.S. Cl.
CPC ........... *H04W 24/10* (2013.01); *H04W 16/14* (2013.01); *H04W 24/08* (2013.01)

(58) Field of Classification Search
CPC .............................. H04W 24/10; H04W 16/14
See application file for complete search history.

(56) References Cited

U.S. PATENT DOCUMENTS

| 2012/0134328 A1* | 5/2012 | Gauvreau | H04L 5/0037 370/329 |
| 2015/0264577 A1* | 9/2015 | Yang | H04W 16/14 370/252 |
| 2015/0351115 A1* | 12/2015 | Jeon | H04W 48/16 455/450 |

(Continued)

FOREIGN PATENT DOCUMENTS

| WO | 2013074639 A1 | 5/2013 |
| WO | 2013179095 A1 | 12/2013 |

OTHER PUBLICATIONS

"3rd Generation Partnership Project; Technical Specification Group Services and System Aspects; Telecommunication Management; Performance Management (PM); Concept and Requirements (Release 13)," 3GPP TS 32.401 V13.0.0, Jun. 2015, pp. 1-29.

(Continued)

*Primary Examiner* — Hashim Bhatti
(74) *Attorney, Agent, or Firm* — Davidson Sheehan LLP

(57) ABSTRACT

A node increments values of performance measurement (PM) counters to indicate characteristics of at least one unlicensed frequency band used for wireless communication during a first time interval. The node provides the values of the PM counters to a controller that is configured to aggregate the values of the PM counters for the node with values of PM counters for other nodes. A controller receives values of PM counters from a plurality of nodes to indicate characteristics of wireless communication by each of the plurality of nodes using the at least one unlicensed frequency (Continued)

band over the first time interval. The controller aggregates the values of the PM counters for the plurality of nodes and modifies a configuration of at least one of the plurality of nodes based on the aggregated values.

21 Claims, 5 Drawing Sheets

(56) References Cited

U.S. PATENT DOCUMENTS

| | | | | |
|---|---|---|---|---|
| 2015/0382214 A1* | 12/2015 | Cheng | ............... | H04W 24/08 |
| | | | | 370/252 |
| 2016/0174107 A1* | 6/2016 | Kanugovi | ............ | H04L 12/28 |
| | | | | 370/236 |
| 2016/0295515 A1* | 10/2016 | Cai | ............... | H04W 52/0261 |

OTHER PUBLICATIONS

"3rd Generation Partnership Project; Technical Specification Group Services and System Aspects; Telecommunication Management; Performance Management (PM); File Format Definition (Release 13)," 3GPP TS 32.432 V13.0.0, Jan. 2016, pp. 1-14.

"Part 11: Wireless LAN Medium Access Control (MAC) and Physical Layer (PHY) Specifications, Amendment 4 Enhancements for Very High Throughput for Operation in Bands Below 6 GHz," IEEE Standard for Information Technology, IEEE Std. 802.11ac-2013, Dec. 11, 2013, pp. 1-425.

LTE-U Forum: LTE-U SDL Coexistence Specifications V1.3, Oct. 2015, pp. 1-12.

"3rd Generation Partnership Project; Technical Specification Group Radio Access Netowrk; Study on Licensed-Assisted Access to Unlicensed Spectrum (Release 13)," 3GPP TR 36.889 V13.0.0, Jun. 2015, 285 pages.

International Search Report and Written Opinion dated Sep. 7, 2017 for PCT Application No. PCT/US2017/026042, 12 pages.

* cited by examiner

PERFORMANCE MEASUREMENT COUNTERS FOR UNLICENSED FREQUENCY BANDS

BACKGROUND

Field of the Disclosure

The present disclosure relates generally to wireless communication systems and, more particularly, to unlicensed frequency bands used in wireless communication systems.

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNIT) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider.

Wireless communication devices that transmit or receive signals in licensed or unlicensed frequency bands are typically referred to as nodes, which may include Wi-Fi access points that operate according to IEEE 802.11 standards in the unlicensed spectrum or base stations that operate in the licensed spectrum according to standards such as Long Term Evolution (LTE) standards defined by the Third Generation Partnership Project (3GPP). For example, Wi-Fi access points may operate according to IEEE Std 802.11ac™-2013 or IEEE Std 802.11n™-2009, which are incorporated herein by reference in their entirety. Nodes can aggregate channels in the licensed spectrum with channels in the unlicensed spectrum to increase bandwidth over the air interface. For example, base stations that operate according to LTE can implement supplementary downlink (SDL) channels in the unlicensed spectrum to provide additional bandwidth for downlink communications to user equipment that are also communicating with the base station using channels in a licensed frequency band. For example, the base station may operate according to the LTE-U SDL Coexistence Specifications v1.3 (2015), which is incorporated herein by reference in its entirety. A primary carrier (sometimes referred to as a Pcell) is anchored in the licensed spectrum and carries the uplink packets and control information for both the uplink and the downlink. The secondary carrier (sometimes referred to as an Scell) conveys best effort downlink data. The licensed frequency bands may be referred to as LTE-L bands and the unlicensed frequency bands may be referred to as LTE-U bands. In some cases, base stations may also support uplink communication in the unlicensed spectrum.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
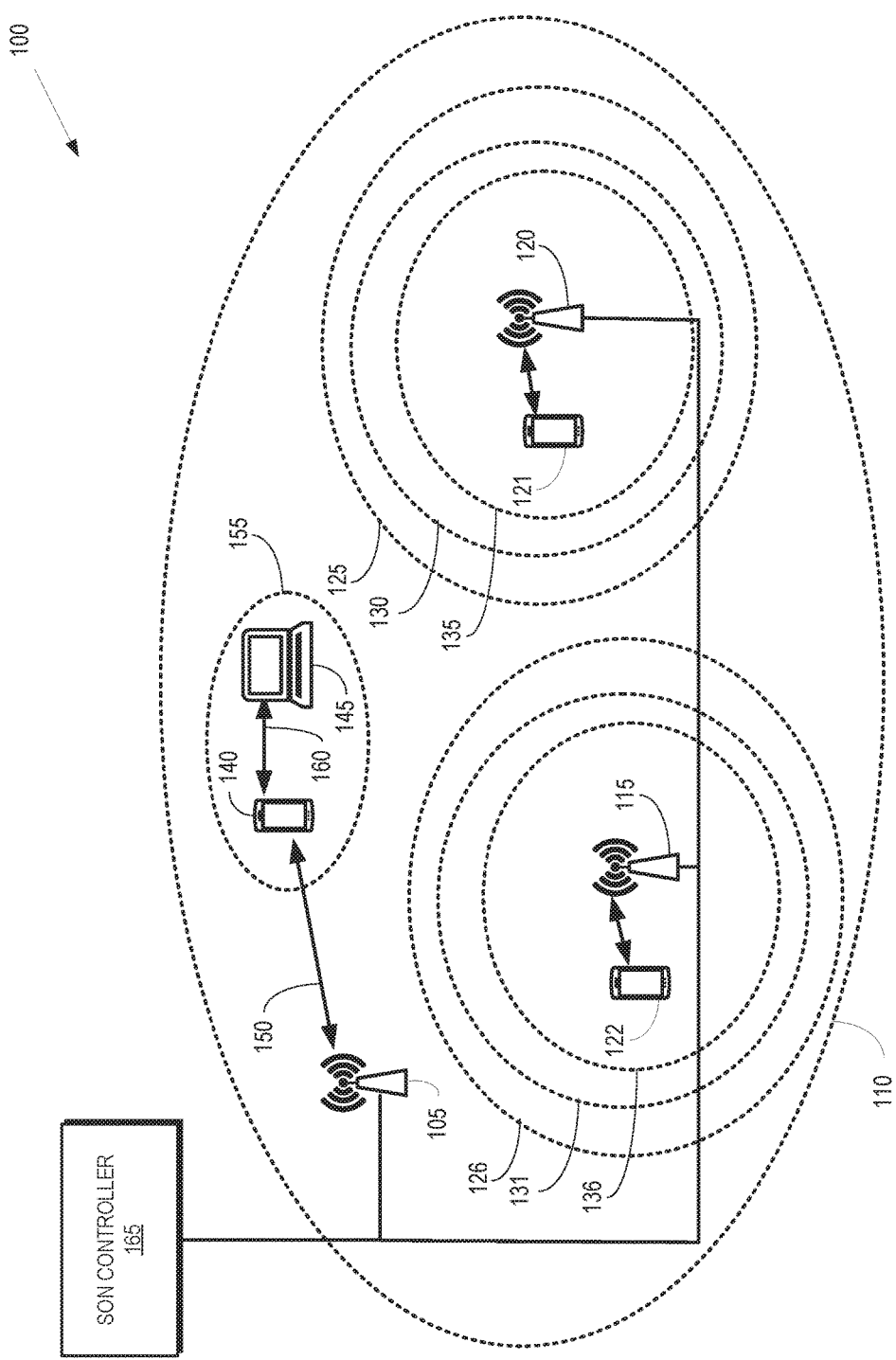
FIG. 1 is a diagram of a wireless communication system according to some embodiments.

Performance measurement (PM) counters are used to collect information that characterizes wireless communication in the licensed frequency bands. However, the behavior of communication in the licensed spectrum differs markedly from the behavior of communication in the unlicensed spectrum. For example, nodes that communicate using unlicensed frequency bands need to coexist with other nodes, which may operate according to different technologies such as the IEEE 802.11 standards for Wi-Fi access points and the LTE-U standards for base stations. Furthermore, nodes that transmit in the unlicensed frequency bands are not necessarily fixed at a particular location. For example, a smartphone may be used to implement a personal Wi-Fi hotspot for tethering other devices such as tablets to the smart phone, which then provides network access to the other devices via the tethered connection. Personal Wi-Fi hotspots may therefore appear at any location and they may exist for any amount of time. The PM counters for the licensed frequency bands do not capture these (and other) important characteristics of communication in the unlicensed spectrum. No PM counters have been defined to characterize these unique aspects of communication in the unlicensed spectrum, which limits the ability of a self-organizing network (SON) to optimize performance in the unlicensed spectrum for dynamically changing network configurations.

Network optimizations may be performed on the basis of information that characterizes operation in the unlicensed spectrum by implementing performance measurement (PM) counters that collect values of metrics indicative of characteristics of communication by one or more nodes in one or more unlicensed frequency bands over a time interval, which may be predetermined. The collected values of the metrics are then provided to a controller in the network such as a self-organizing network (SON) controller. The controller may use the values of the metrics for all of the nodes in a network to optimize deployment and operation of nodes within the network. Some embodiments of the controller combine the values of the metrics for a subset of the nodes in a geographical area or cluster and perform optimizations for the subset. The PM counters for the nodes may collect values of metrics that indicate congestion, loading, or resource utilization of the unlicensed frequency bands by the nodes. The PM counters may also collect values of metrics that indicate numbers of other devices sharing channels in the unlicensed frequency bands, resource usage by the other devices, whether the node has disabled communication in the unlicensed spectrum, overhead for clear channel assessment, channel occupancy, and the like. User equipment that are communicating with the node using the unlicensed frequency bands may also collect values of PM counters indicating whether the user equipment has disabled communication in the unlicensed frequency spectrum, channel quality, and the like. The values of the PM counters collected by the user equipment can then be transmitted to the node. In some embodiments, values of the PM counters can be normalized over a time interval that corresponds to the time interval for collecting PM counters that characterize the licensed spectrum. The values of the PM counters may also be normalized over different small cells that operate in the unlicensed frequency band.

FIG. 1 is a diagram of a wireless communication system 100 according to some embodiments. The wireless communication system 100 includes one or more eNodeBs 105 that provide wireless connectivity according to a first radio access technology (RAT), e.g., according to the LTE standards defined by the Third Generation Partnership Project (3GPP). The eNodeB 105 provides wireless connectivity within a first geographical area or cell 110. The wireless communication system 100 also includes small cells 115, 120 that provide wireless connectivity according to the first RAT and a second RAT such as Wi-Fi, as defined by the IEEE 802 standards. The small cells 115, 120 may provide wireless connectivity according to the first and second RATs using collocated transceivers or transceivers that are connected by an interface. As used herein, the term "node" may be used to indicate entities that provide wireless connectivity according to the first or second RATs. Thus, the term "node" may refer to eNodeBs that are part of a macrocellular network, as well as access points or small cells that overlay the macrocellular network. Small cells may also be referred to as home base station routers, metrocells, microcells, picocells, femtocells, and the like.

Some embodiments of the eNodeB 105 or the small cells 115, 120 may operate according to fifth-generation (or 5G) standards for wireless communication. The 5G standards may specify data rates of tens of megabits per second that can be supported for tens of thousands of concurrent users, several hundreds of thousands of simultaneous connections, improved spectral efficiency relative to LTE, reduce latency relative to LTE, and the like.

The small cells 115, 120 may provide uplink or downlink communications to user equipment 121, 122 over one or more carriers in a licensed frequency band within the cells 125, 126. Examples of user equipment 121, 122 include wireless communication devices that operate according to LTE, machine-to-machine (M2M) devices, smart phones, mobile terminals, wireless-enabled tablets, wireless network interface cards, Wi-Fi sticks, radio transceivers integrated with sensors, 5G transceivers, 5G radio terminals, and the like. The licensed carriers operate according to the first RAT and may be referred to as LTE licensed (LTE-L) carriers. The small cells 115, 120 may also support wireless connectivity over carriers in one or more unlicensed frequency bands according to the first RAT within cells 130, 131. The unlicensed carriers that operate according to the first RAT may be referred to as LTE unlicensed (LTE-U) carriers. The unlicensed frequency bands may include the Unlicensed National Information Infrastructure (UNIT), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. In some embodiments, the transmission power used by the small cells 115, 120 to transmit signals in the licensed frequency band is larger than the transmission power used by the small cells 115, 120 to transmit signals in the unlicensed frequency band according to the first RAT. Consequently, the cells 125, 126 are larger than the corresponding cells 130, 131 in FIG. 1.

The small cells 115, 120 may operate one or more of the unlicensed carriers in different operating modes. For example, the small cells 115, 120 may implement a supplemental downlink carrier in the unlicensed frequency band according to the first RAT. The supplemental downlink carrier is used to carry best effort downlink data from the small cells 115, 120 to the user equipment 121, 122. A primary carrier is anchored in the licensed frequency band and is used to carry control data for the supplemental downlink carrier, as well as uplink data from the user equipment 121, 122 to the corresponding small cells 115, 120. For another example, the small cells 115, 120 may implement a carrier aggregation mode in which a secondary carrier in the unlicensed frequency band carries both uplink and downlink best effort data. A primary carrier is anchored in the licensed frequency band and is used to carry control data for the secondary carrier.

The small cells 115, 120 also support wireless connectivity over carriers in the unlicensed frequency bands that operate according to the second RAT within cells 135, 136. For example, the small cells 115, 120 may support wireless connectivity over carriers that operate according to conventional Wi-Fi or carrier-grade Wi-Fi, which supports additional functionality such as user authentication, mobility management, and the like. In some embodiments, the transmission power used by the small cells 115, 120 to transmit signals in the licensed frequency band is larger than the transmission power used by the small cells 115, 120 to transmit signals in the unlicensed frequency band according to the first RAT, which is larger than the transmission power used by the small cells 115, 120 transmit signals in the unlicensed frequency bands according to the second RAT. Since the uplink transmit power in unlicensed spectrum is less than that of the uplink transmit power of the licensed spectrum (around 3 dB difference), the coverage areas of cells 135, 136 are smaller than that of the coverage area of cells 130, 131 in which uplink traffic including control and signaling traffic is carried over the licensed spectrum.

Some embodiments of user equipment 140 may be used to provide wireless connectivity in the unlicensed frequency bands to other wireless-enabled devices such as a laptop 145. Providing wireless connectivity to the laptop 145 via the user equipment 140 may be referred to as tethering the laptop 145 to the user equipment 140. The user equipment 140 can establish a wireless connection 150 with the eNodeB 105 in the licensed frequency bands according to the first RAT. The user equipment 140 also provides wireless connectivity according to the second RAT within a corresponding cell 155 and the laptop 145 can establish a wireless connection 160 with the user equipment 140 using channels of the unlicensed frequency bands according to the second RAT. The user equipment 140 may convey uplink information from the laptop 145 to the eNodeB 105 over the wireless connection 150 and downlink information from the eNodeB 105 to the laptop 145 over the wireless connection 160.

The wireless communication system 100 includes a self-organizing network (SON) controller 165 that is configured to perform planning, configuration, management, optimization, and healing of the wireless communication system 100. For example, the eNodeB 105 is configured to monitor characteristics of communication in the licensed frequency bands according to the first RAT. The information acquired during the monitoring may be used to increment performance measurement (PM) counters associated with the licensed frequency bands. The eNodeB 105 increments the PM counters over a time interval such as a 15 minute time interval and then provides the values of the PM counters to the SON controller 165, which may use the PM counter values to perform planning, configuration, management, optimization, or healing operations.

Nodes that provide wireless connectivity in the unlicensed frequency bands according to the first or second RAT are also configured to monitor characteristics of communication in the unlicensed frequency bands. The nodes increment PM counters that characterize the unlicensed frequency bands based on the monitored information. For example, the small cells 115, 120 may increment values of PM counters maintained by the small cells 115, 120 to indicate characteristics of wireless communication using one or more unlicensed frequency bands over a time interval. The time interval used by the small cells 115, 120 to monitor the unlicensed frequency bands may differ from the time interval used by the eNodeB 105 to monitor the licensed frequency bands. The small cells 115, 120 may provide the values of the PM counters to the SON controller 165, which may aggregate the values of the PM counters received from the small cells 115, 120 with the values of the PM counters for the unlicensed frequency bands received from other nodes.

Some embodiments of the user equipment 140 may include PM counters for the unlicensed frequency bands that are used for communication within the cell 155. The user equipment 140 may therefore monitor characteristics of communication over the unlicensed frequency bands within the cell 155 and increment the PM counters to indicate the monitored characteristics. Values of the PM counters maintained by the user equipment 140 may be provided to the SON controller 165 at regular, periodic, or other time intervals. For example, the user equipment 140 may transmit a message including the values of the PM counters over the wireless communication link 150 to the eNodeB 105, which may then forward the information indicating the values of the PM counters to the SON controller 165. The user equipment 121, 122 may also include PM counters that are incremented to indicate characteristics of communication in the unlicensed frequency bands. The values of the PM counters maintained by the user equipment 121, 122 may also be provided to the SON controller 165 at regular, periodic, or other time intervals.

Examples of PM counters that may be incremented by a node that is monitoring characteristics of communication in an unlicensed frequency band include:

A channel congestion metric that indicates a degree of congestion in channels of the unlicensed frequency band. The channel congestion metric may represent a minimum level of congestion, a maximum level congestion, an average level of congestion, or other indication.

A channel loading metric that indicates a degree of loading on channels of the unlicensed frequency band. The channel loading metric may represent a minimum level of loading, a maximum level of loading, an average level of loading, or other indication.

A channel resource utilization metric that indicates utilization of the channels of the unlicensed frequency band. A value of 1 may indicate that the channel is being utilized over a time interval and a value of 0 may indicate that the channel is not being utilized over the time interval. The metric may represent a minimum level of utilization, a maximum level of utilization, an average of the resource utilization, or other indication.

A number of nodes operating according to a different RAT from the RAT used by the monitoring nodes that are sharing the channels of the unlicensed frequency band.

A number of nodes that operate according to the different RAT and use the channels of the unlicensed frequency band as a primary channel e.g., for transmitting a Wi-Fi beacon signal.

A number of nodes that operate according to the same RAT as the monitoring node and share the channels of the unlicensed frequency band with the monitoring node.

A number of times the monitoring node has switched channels in the unlicensed frequency band.

A current operating channel of the monitoring node in the unlicensed frequency band.

A previous operating channel of the monitoring node in the unlicensed frequency band.

A utilization load for nodes that operate according to the different RAT such as a Wi-Fi medium utilization load on channels of the unlicensed frequency band. In some embodiments the utilization load may indicate a voice traffic load with appropriate quality-of-service markings, a short packet load that may include unmarked voice-over-IP loads, or other traffic loads.

A time interval in which the service in the unlicensed frequency bands is disabled. For example, channels in the unlicensed frequency bands may be turned off to reduce interference on other nodes due opportunistic supplemental downlink traffic, to improve performance of applications such as voice-over-LTE in licensed frequency bands, or at operator discretion.

In some embodiments, the aforementioned PM counters are collected over a time interval that may be indicated as a number of seconds.

Nodes that operate in accordance with the requirements of LBT communication may implement PM counters that indicate characteristics of LBT communication in the unlicensed frequency bands. Examples of the LBT-specific PM counters include:

An overhead time interval consumed by clear channel assessment. For example, a percentage of time spent performing clear channel assessment may be used as an indication of the overhead. Higher values of the overhead time PM counter indicate difficulty acquiring a channel of the unlicensed frequency band.

A number of times, or a percentage of a time window, that a channel in the unlicensed frequency band was released by the monitoring node before the allowed channel occupancy time due to a lack of traffic to occupy the channel for the duration of the allowed channel occupancy time.

Nodes that do not operate in accordance with the requirements of LBT communication may implement PM counters that indicate characteristics of non-LBT communication in the unlicensed frequency bands. Examples of the non-LBT-specific PM counters include:

An indication of a duty cycle used by the monitoring node for communication in the unlicensed frequency bands. The duty cycle may have a duration of around 20 msec, which may be static, dynamic, or adaptive.

An indication of a type of subframe puncturing used by the monitoring node. The types may include no puncturing, puncturing of an ON time interval with one silent subframe every twenty subframes, puncturing of the ON time interval with three silent subframes for every ten subframes, puncturing of the ON time interval with three silent subframes every five subframes, and the like.

Performance of user equipment 121, 122, 140 during communication in the unlicensed frequency bands may also be monitored using PM counters that indicate:

The user equipment has disabled communication in the unlicensed frequency band due to low battery charging levels or low battery life expectancy.

The user equipment has disabled communication in the unlicensed frequency band according to a first RAT (such as LTE) in response to establishing a connection in the unlicensed frequency band according to a second RAT (such as Wi-Fi).

A channel signal-to-noise ratio (SNR), signal-to-interference-plus-noise ratio (SINR), or other indication of channel quality in the unlicensed frequency band.

Nodes that communicate using channels in the unlicensed frequency bands (such as the small cells 115, 120 or the user equipment 140) are required to share the channels with each other in a time division multiplexed (TDM) manner. In some embodiments, nodes may perform clear channel assessment to select channels for downlink transmission in unlicensed frequency bands. For example, the small cells 115, 120 or the user equipment 140 may measure energy received in channels in the unlicensed frequency bands to identify a "clear" channel. A channel may be considered clear if an average of the received energy from other base stations or access points on the channel is below a threshold value. The small cells 115, 120 or the user equipment 140 may then use the clean channel for downlink transmissions. If the base station is unable to identify a clean channel, the base station has to share the channel with one or more other transmitting nodes. This approach may be referred to as Listen-Before-Talk (LBT). In countries such as the U.S. that do not mandate Listen-Before-Talk (LBT) regulations for operation in the unlicensed spectrum, the nodes may employ a transmission cycle with an appropriate duty cycle of ON/OFF periods to co-exist on shared channels with Wi-Fi and other LTE base-stations on the same channel of the unlicensed spectrum. For example, the small cells 115, 120 or the user equipment 140 may share a channel in the unlicensed frequency band with one or more access points by transmitting signals on the channel for a time interval (ON) and bypassing transmissions during a subsequent time interval (OFF).

Due to the constraints of TDM channel sharing in the unlicensed frequency bands, the small cells 115, 120 and the user equipment 140 may only be able to access the unlicensed frequency bands during a fraction of the available time. The PM counters for the unlicensed frequency bands may therefore be normalized to facilitate comparison with the PM counters for the licensed frequency bands. To normalize the values of the PM counters, some embodiments of the small cells 115, 120 and the user equipment 140 only modify values of the PM counters for the unlicensed frequency bands during the time intervals in which the nodes are permitted to transmit on one or more channels of the unlicensed frequency bands. For example, the small cells 115, 120 and the user equipment 140 may only modify values of the PM counters by incrementing the values during ON intervals of a duty cycle for the unlicensed frequency bands. The PM counters are not modified during predetermined OFF intervals. The values of the PM counters may be incremented until a total elapsed time (e.g., a sum of a predetermined ON intervals) is equal to a time interval for incrementing PM counters associated with communication in the licensed frequency bands. The values of the PM counters associated with the unlicensed frequency bands may therefore reflect the same duration of channel access time as the values of the PM counters associated with the licensed frequency bands.

In some embodiments, the PM counters associated with the unlicensed frequency bands are normalized such that the total PM counters for the unlicensed frequency bands are recorded (and reported to the SON controller 165) when the total channel access time becomes equal to a predetermined length of time such as 15 minutes, which may also be used for the PM counters associated with the licensed frequency band. Temporal normalization of the PM counters associated with the unlicensed frequency bands supports the evaluation of the performance of nodes that operate in the unlicensed frequency bands. Temporal normalization also allows the SON controller 165 to compare the performance of licensed and unlicensed frequency bands in a co-related fashion with equal channel access time. A method of normalizing may be represented as:

```
Void function
Unlicensed_spectrum_PM_Counter_Normalization( )
{
    PM_COUNTER_REPORTING_INTERVAL = 15 minutes;
    Total_channel_occupancy_Time = 0;
    While (1)
    {
        Total_channel_occupancy_Time +=
        current_channel_occupancy_time;
        If (Total_channel_occupancy_Time >=
        PM_COUNTER_REPORTING_INTERVAL)
        {
          Record the PM counters associated with the unlicensed
        channel for SON usage;
            Total_channel_occupancy_Time = 0;
        }
    }
```

Once a set of PM counters for the unlicensed frequency band is recorded the total channel access time counter is reset to zero, and a next iteration of the next recording interval is started. Some embodiments of a report including the values of the PM counters include information indicating a total clock time for the report, which in this example may be much greater than 15 minutes due to the OFF intervals in which the node does not have access to the channel of the unlicensed frequency band. Some embodiments of the normalization ensure that the PM counters for the unlicensed frequency band are accurately post-processed by the SON controller 165. The normalization also ensures that the PM counters associated with the licensed and unlicensed frequency bands are modified or incremented over the same total channel access time (e.g. 15 minutes) for a proper co-related system performance analysis.

The ON intervals for the small cells 115, 120 or the user equipment 140 may differ. Consequently, the actual channel occupancy time for the small cells 115, 120 or the user equipment 140 in the unlicensed frequency band may differ within any last time interval. The PM counters that measure characteristics of wireless communication in the unlicensed frequency bands by the small cells 115, 120 or the user equipment 140 may therefore be normalized to a common time interval. In some embodiments, the PM counters may be normalized over the unlicensed frequency bands, e.g., by configuring the small cells 115, 120 and the user equipment 140 to increment the PM counters over a common channel occupancy time interval.

Figure 2:
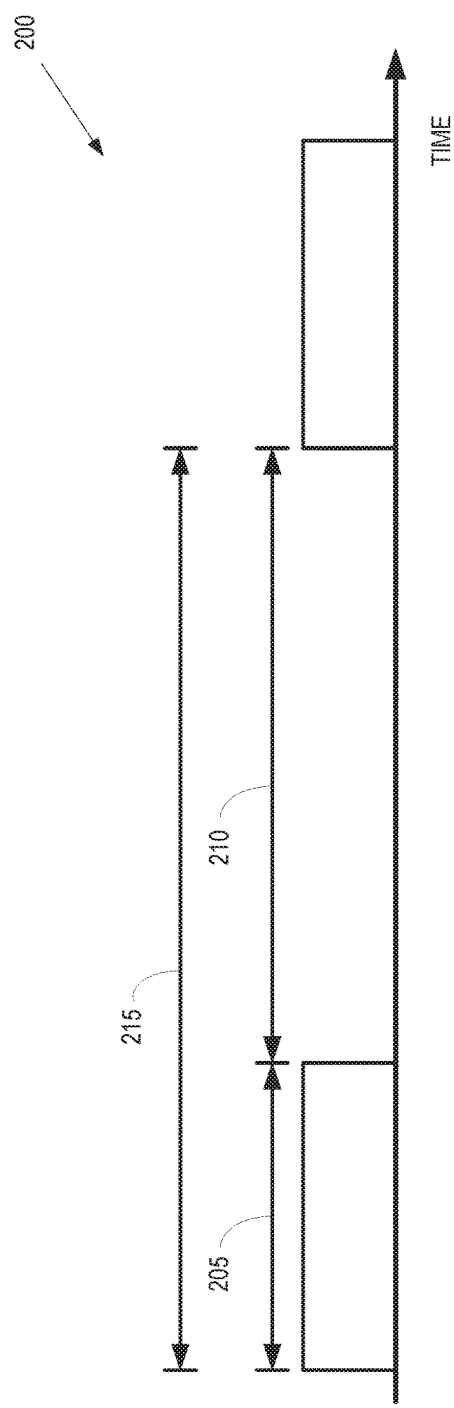
FIG. 2 is a diagram showing allocation of time intervals for downlink transmissions by a node on a channel of an unlicensed frequency band according to some embodiments.

FIG. 2 is a diagram showing allocation 200 of time intervals for downlink transmissions by a node on a channel of an unlicensed frequency band according to some embodiments. The horizontal axis indicates time increasing from left to right. The node operates according to a first RAT (such as LTE) and may be used to implement embodiments of the small cells 115, 120 or the user equipment 140 shown in FIG. 1. In the illustrated embodiment, the node shares the channel of the unlicensed frequency band with two other nodes that operate according to a second RAT (such as Wi-Fi). The node acquires or reserves the channel for downlink transmissions during an ON interval 205 and bypasses downlink transmissions on the channel during an OFF interval 210. The duty cycle 215 is equal to the sum of the ON interval 205 and the OFF interval 210. The duty cycle 215 may repeat indefinitely or for a predetermined amount of time. For example, the duty cycle 215 may be increased in response to additional nodes sharing the channel or decreased in response to one or more nodes ending transmissions over the shared channel. The node in FIG. 2 is operating in a non-LBT mode and therefore utilizes the duty cycle 215. For LBT mode of operation, the channel is acquired via clear channel assessment operation, whenever the node has data to transmit.

Figure 3:
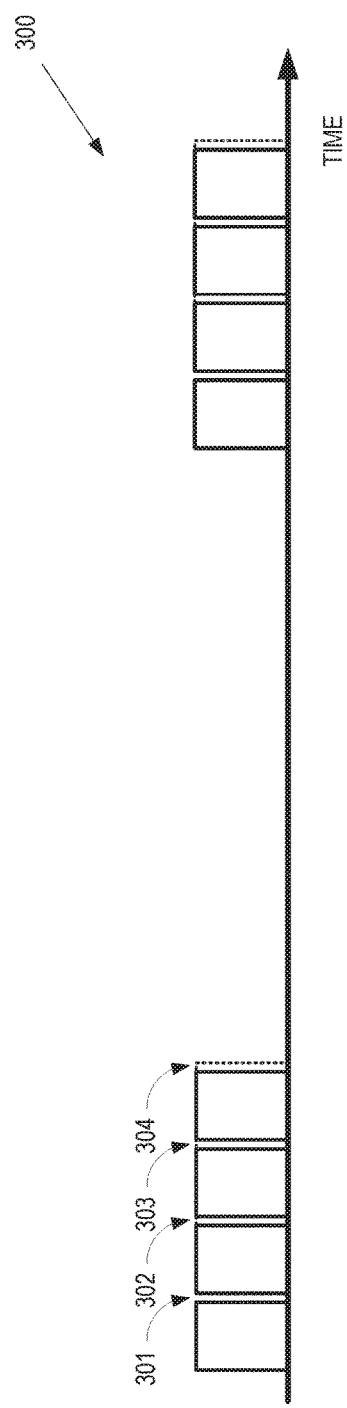
FIG. 3 is a diagram showing allocation of silent gaps in time intervals for downlink transmissions by a node on a channel of an unlicensed frequency band according to some embodiments.

FIG. 3 is a diagram showing allocation 300 of silent gaps in time intervals for downlink transmissions by a node on a channel of an unlicensed frequency band according to some embodiments. The horizontal axis indicates time increasing from left to right. The node may correspond to the node described in FIG. 2. The node operates according to the first RAT and shares the channel of the unlicensed frequency band with two other nodes that operate according to a second RAT. The allocation 300 differs from the allocation 200 shown in FIG. 2 because the ON interval is punctured with silent gaps 301, 302, 303, 304 (which may be referred to as "the silent gaps 301-304"). The duration of the silent gaps 301-304 is determined based on a measurement of medium usage by the nodes that operate according to the second RAT. For example, the silent gaps 301-304 may have a duration of 1 ms for every 10 ms of the ON interval for the node. The node in FIG. 3 is operating in a non-LBT mode.

Figure 4:
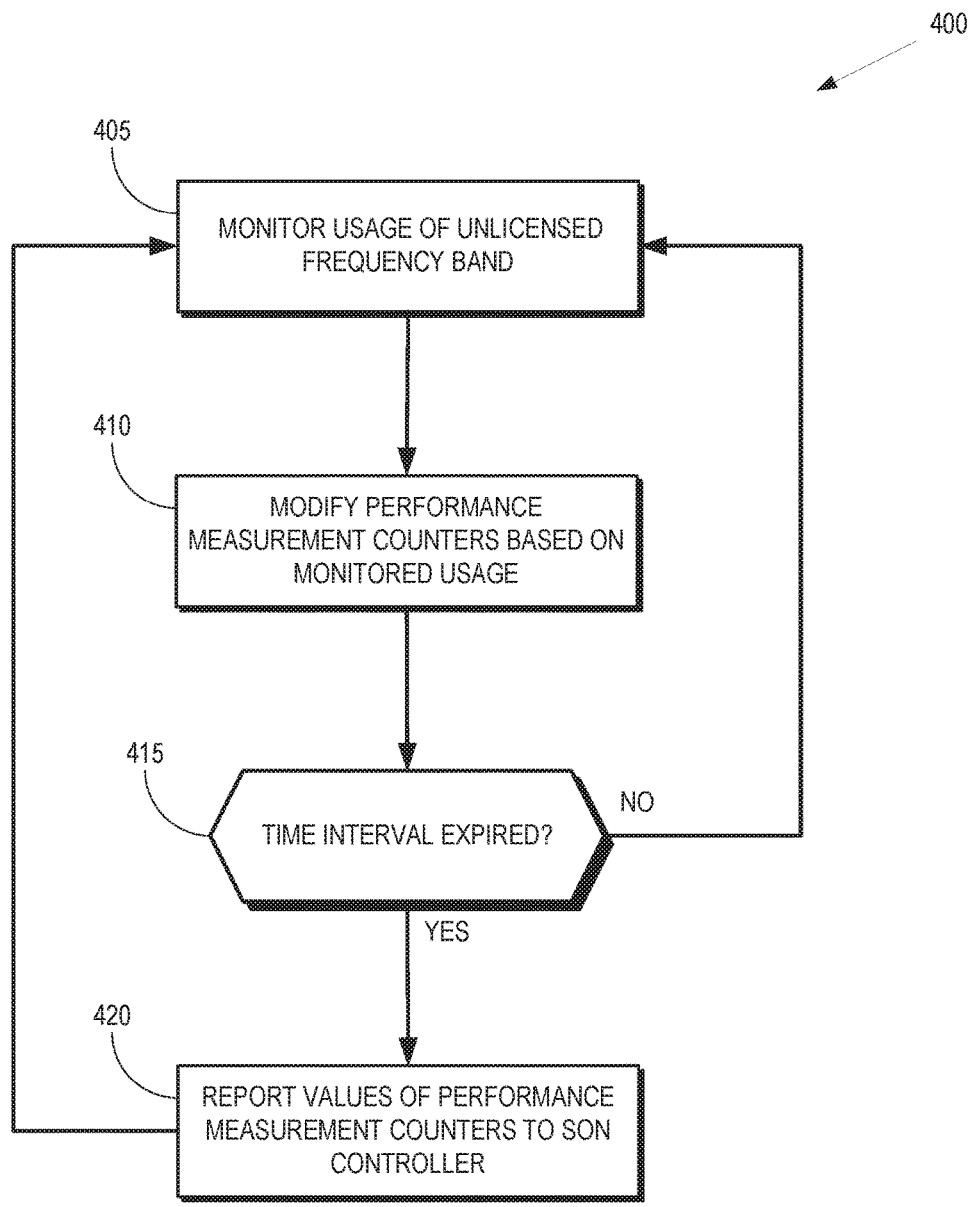
FIG. 4 is a flow diagram of a method for monitoring characteristics of communication in unlicensed frequency bands according to some embodiments.

FIG. 4 is a flow diagram of a method 400 for monitoring characteristics of communication in unlicensed frequency bands according to some embodiments. The method 400 may be implemented in some embodiments of the wireless communication system 100 shown in FIG. 1. At block 405, one or more nodes monitor usage of channels in the unlicensed frequency bands. For example, monitoring may be performed by the small cells 115, 120 or the user equipment 140 shown in FIG. 1. Usage may be characterized by parameters that indicate congestion, loading, resource utilization, channel sharing with other nodes, switching channels, enabling or disabling communication in the unlicensed frequency bands, clear channel assessment, and the like, as discussed herein. At block 410, the monitoring nodes modify corresponding PM counters based on the monitored usage of the channels in the unlicensed frequency bands. For example, the corresponding PM counters may be incremented to indicate usage of the channels in the unlicensed frequency bands.

At decision block 415, the monitoring nodes determine whether a time interval for monitoring the usage and modifying the PM counters has expired. If not, the method 400 flows to block 405 and the nodes continue to monitor usage and modify the PM counters. Once the time interval for monitoring the usage has expired, the method 400 flows to block 420. At block 420, the nodes report values of the PM counters to a controller such as the SON controller 165 shown in FIG. 1. In response to reporting the values of the PM counters, the nodes may reset the PM counters. The method 400 then flows to block 405 so that the nodes can continue to monitor usage and begin modifying the PM counters for the subsequent time interval.

Figure 5:
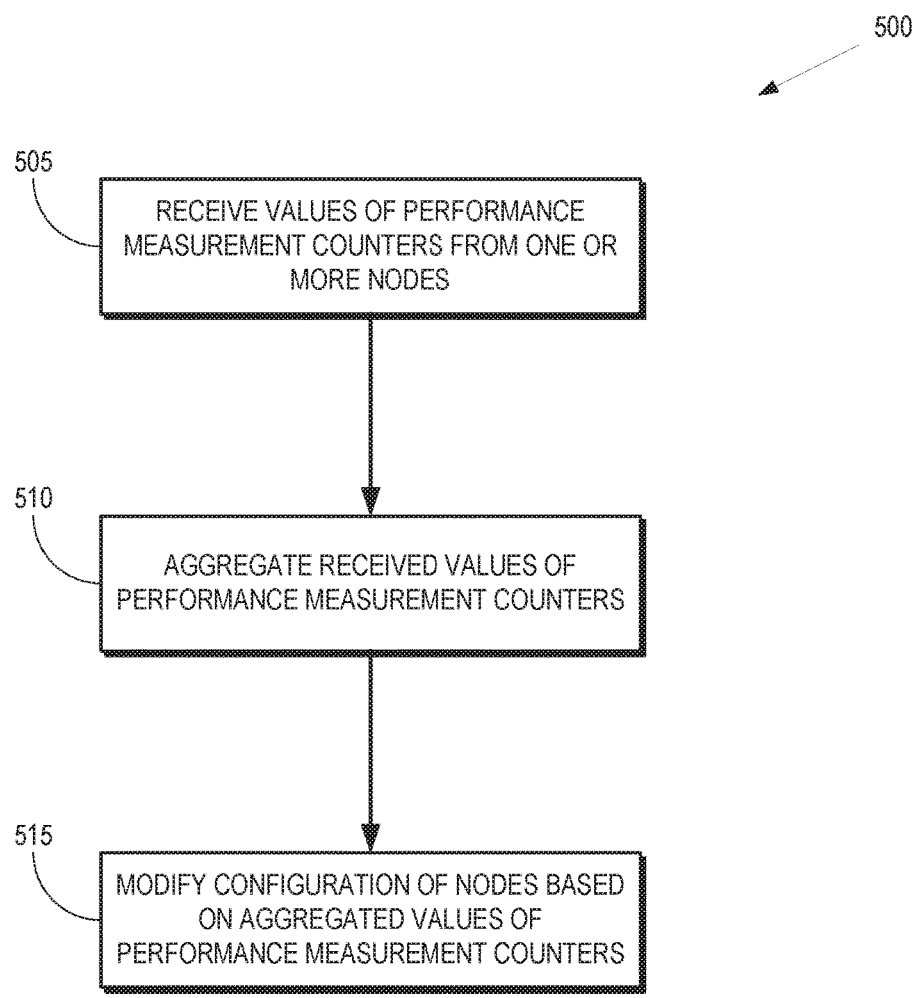
FIG. 5 is a flow diagram of a method for aggregating values of performance measurement (PM) counters received from one or more nodes according to some embodiments.

FIG. 5 is a flow diagram of a method 500 for aggregating values of performance measurement counters received from one or more nodes according to some embodiments. The method 500 may be implemented in some embodiments of the SON controller 165 shown in FIG. 1. At block 505, the controller receives values of performance measurement counters from one or more nodes. In some embodiments, the nodes are part of a predetermined cluster or are located in a predetermined geographic area. At block 510, the controller aggregates the received values of the PM counters. For example, the controller may combine the values of the same PM counters from different nodes to form sums, minima, maxima, averages, or other statistical combinations of the values of the PM counters. The controller may aggregate the PM counters from the predetermined clusters of nodes or nodes in the predetermined geographic areas.

At block 515, the controller modifies configuration of the nodes based on the aggregated values of the PM counters. For example, the controller may modify the configuration of supplemental downlink communication by the nodes in the unlicensed frequency band by enabling supplemental downlink communication for one subset of the nodes and disabling supplemental downlink communication for another subset of the nodes. For another example, the controller may use the aggregated values of the PM counters across a cluster or geographic area to characterize the health of the network. For yet another example, the controller may use the aggregated values of the PM counters to identify Wi-Fi traffic patterns in clusters or geographic areas to identify ways to monetize using carrier grade Wi-Fi services such as by offering users service in the unlicensed frequency band that is supported by LTE-U at lower cost. Offering the services based on the identified Wi-Fi traffic patterns may help reduce the total cost of operation of the nodes as well as optimizing use of the unlicensed frequency bands. In some embodiments, configuration of the nodes is performed in response to detecting the presence of a new node or detecting the absence of a previously detected node, such as a personal Wi-Fi hotspot associated with the user equipment.

Figure 6:
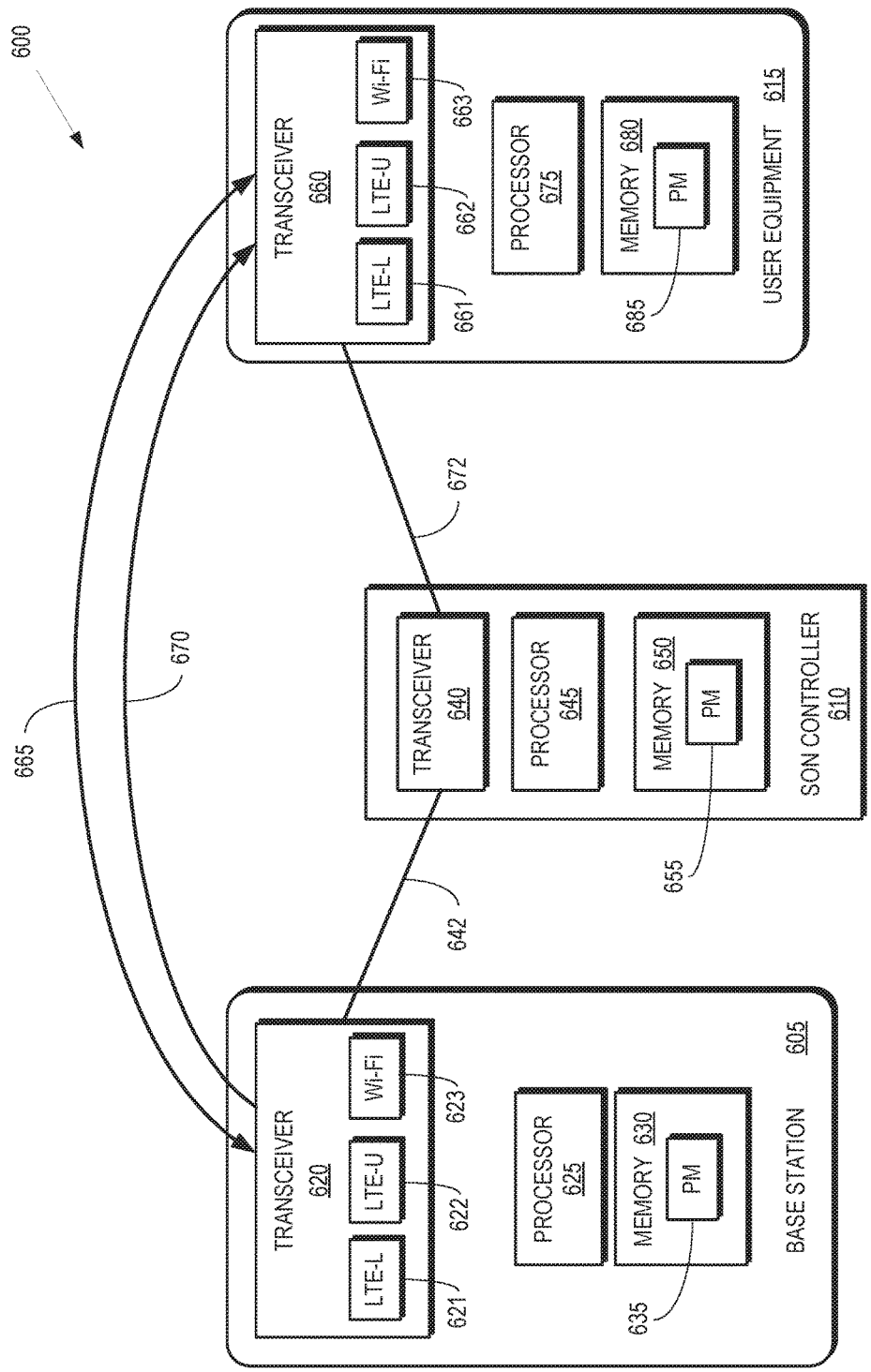
FIG. 6 is a block diagram of a wireless communication system that maintains PM counter values for unlicensed frequency bands according to some embodiments.

FIG. 6 is a block diagram of a wireless communication system 600 that maintains PM counter values for unlicensed frequency bands according to some embodiments. The communication system 600 includes a base station 605, a SON controller 610, and a user equipment 615. The base station 605, the SON controller 610, and the user equipment 615 may be used to implement some embodiments of the small cells 115, 120, the SON controller 165, or the user equipment 121, 122, 140 shown in FIG. 1.

The base station 605 includes a transceiver 620 for transmitting and receiving signals. Some embodiments of the transceiver 620 include an LTE-L module 621 for supporting wireless communication in licensed frequency bands according to LTE, an LTE-U module 622 for supporting wireless communication in unlicensed frequency bands according to LTE, and a Wi-Fi module 623 for supporting wireless communication in unlicensed frequency bands according to Wi-Fi. The base station 605 also includes a processor 625 and a memory 630. The processor 625 may be used to execute instructions stored in the memory 630 and to store information in the memory 630 such as the results of the executed instructions. The memory 630 in the base station 605 also implements a set of performance counters 635 for storing values representative of characteristics of wireless communication in the unlicensed frequency bands. The transceiver 620, the processor 625, and the memory 630 may therefore be configured to implement some embodiments of the method 400 shown in FIG. 4 and the method 500 shown in FIG. 5.

The SON controller 610 includes a transceiver 640 for transmitting and receiving signals, such as signals received from the transceiver 620 over an interface 642. The SON controller 610 also includes a processor 645 and a memory 650. The processor 645 may be used to execute instructions stored in the memory 650 and to store information in the memory 650 such as the results of the executed instructions. The memory 650 also implement storage for performance counters 655, which may be used to store values representative of characteristics of wireless communication in the unlicensed frequency bands that are determined based on reported values received from the base station 605, the user equipment 615, or other nodes. The transceiver 640, the processor 645, and the memory 650 may therefore be used to implement some embodiments of the method 400 shown in FIG. 4 and the method 500 shown in FIG. 5.

The user equipment 615 includes a transceiver 660 for transmitting and receiving signals. Some embodiments of the transceiver 660 include an LTE-L module 661 for supporting wireless communication in licensed frequency bands according to LTE, an LTE-U module 662 for supporting wireless communication in unlicensed frequency bands according to LTE, and a Wi-Fi module 663 for supporting wireless communication in unlicensed frequency bands according to Wi-Fi. For example, the modules 661-663 may be used to support uplink and downlink communication with the base station 605 in the licensed frequency band over the wireless communication link 665 and downlink (or in some cases uplink) communication with the base station 605 in the unlicensed frequency bands over the wireless communication link 670. The transceiver 660 may also communicate with the SON controller 610 over the interface 672. The user equipment 615 also includes a processor 675 and a memory 680. The processor 675 may be used to execute instructions stored in the memory 680 and to store information in the memory 680 such as the results of the executed instructions. The memory 680 also implements a set of performance counters 685 for storing values representative of characteristics of wireless communication in the unlicensed frequency bands. The transceiver 660, the processor 675, and the memory 680 may therefore be configured to implement some embodiments of the method 400 shown in FIG. 4 and the method 500 shown in FIG. 5.

At least parts of the wireless communication system 600 including the base station 605 may be implemented using network functions virtualization (NFV), which is a network architecture that makes use of technologies of computer virtualization. In an NFV architecture, entities such as the base station 605 or parts thereof or part of their functions can be virtualized using software building blocks that may connect, or interact, to create communication services. A virtualized network function of, e.g. the base station 605, may include at least one virtual machine running different software and processes, on top of standard high-volume servers, switches and storage, or a cloud computing infrastructure, instead of having customized hardware appliances for each network function. As such a base station function may be implemented using a computer program product embodied on a non-transitory computer readable medium for performing operations. The computer program product may include instructions, that when executed by a processor, perform the operations of the specific base station function. A radio interface of a base station or a radio interface of an access point (such as radio interfaces supported by the transceiver 620, the LTE-L module 621, the LTE-U module 622, or the Wi-Fi module 623) may be located in one location and corresponding processing functions can be located at a remote location. The entities at the different locations may be connected via optical links or other wired or wireless communication links. Base stations or access points that implement radio interfaces and corresponding processing functions at different locations may be referred to as distributed base stations or access points.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   modifying values of performance measurement (PM) counters in a node to indicate characteristics of at least one unlicensed frequency band used for wireless communication during a first time interval, wherein the node only modifies the values of the PM counters during ON time intervals in which the node is permitted to transmit over the at least one unlicensed frequency band; and
   providing the values of the PM counters to a controller that is configured to aggregate the values of the PM counters for the node with values of PM counters for other nodes.

2. The method of claim 1, wherein modifying the values of the PM counters comprises modifying values of PM counters to indicate at least one of congestion, loading, and resource utilization of the at least one unlicensed frequency band by the node over the first time interval.

3. The method of claim 1, wherein modifying the values of the PM counters comprises modifying values of PM counters to indicate at least one of a number of other nodes sharing the at least one unlicensed frequency band, a number of other nodes using the at least one unlicensed frequency band as a primary channel for transmitting a beacon signal, utilization of the at least one unlicensed frequency band by another node, a current operating channel of the node in the at least one unlicensed frequency band, a previous operating channel of the node in the at least one unlicensed frequency band, a number of channel switches by the node in the at least one unlicensed frequency band, and a disabled time interval during which the node does not use the at least one unlicensed frequency band.

4. The method of claim 1, wherein modifying the values of the PM counters comprises modifying values of PM counters to indicate at least one of an overhead time interval for clear channel assessment, a number of times a channel was released prior to an allowed channel occupancy time, a duration of a carrier sense adaptive transmission cycle, and a type of subframe puncturing.

5. The method of claim 1, wherein modifying the values of the PM counters comprises modifying the values of the PM counters to indicate characteristics of wireless communication according to a first radio access technology (RAT) using the at least one unlicensed frequency band, and wherein modifying the values of the PM counters comprises modifying values of PM counters to indicate at least one of disabling service in the at least one unlicensed frequency band according to the first RAT, enabling service in the at least one unlicensed frequency band according to the first RAT, enabling service in the at least one unlicensed frequency band according to a second RAT, and disabling service in the at least one unlicensed frequency band according to the second RAT.

6. The method of claim 1, further comprising:
   normalizing the values of the PM counters over a second time interval, wherein the second time interval corresponds to a time interval for collecting PM counters that indicate characteristics of wireless communication in at least one licensed frequency band or a time interval for collecting PM counters that indicate characteristics of wireless communication in the at least one unlicensed frequency band by another node.

7. The method of claim 6, wherein normalizing the values of the PM counters comprises modifying the values of the PM counters only during the ON time intervals in which the node is permitted to transmit over the at least one unlicensed frequency band until the sum of the ON time intervals equals the second time interval.

8. A method comprising:
   receiving values of performance measurement (PM) counters from a plurality of nodes to indicate characteristics of at least one unlicensed frequency band used by each of the plurality of nodes for wireless communication during a first time interval, wherein the nodes only modify the values of the PM counters during ON time intervals in which the nodes are permitted to transmit over the at least one unlicensed frequency band; and
   aggregating the values of the PM counters for the plurality of nodes; and
   modifying a configuration of at least one of the plurality of nodes based on the aggregated values.

9. The method of claim 8, wherein receiving the values of the PM counters from the plurality of nodes comprises receiving values of PM counters from a plurality of nodes in at least one of a cluster or a geographic area.

10. The method of claim 9, wherein modifying the configuration of at least one of the plurality of nodes comprises modifying the configuration of at least one of the plurality of nodes in the cluster or the geographic area.

11. An apparatus comprising:
    a memory configured to implement performance measurement (PM) counters; and
    a processor configured to modify values of the PM counters to indicate characteristics of at least one unlicensed frequency band used for wireless communication during a first time interval and provide the values of the PM counters to a controller that is configured to aggregate the values of the PM counters with values of PM counters for other nodes, wherein the processor only modifies the values of the PM counters during ON time intervals in which the apparatus is permitted to transmit over the at least one unlicensed frequency band.

12. The apparatus of claim 11, wherein the processor is configured to modify the values of the PM counters to indicate at least one of congestion, loading, and resource utilization of the at least one unlicensed frequency band.

13. The apparatus of claim 11, wherein the processor is configured to modify the values of the PM counters to indicate at least one of a number of other nodes sharing the at least one unlicensed frequency band, a number of other nodes using the at least one unlicensed frequency band as a primary channel for transmitting a beacon signal, utilization of the at least one unlicensed frequency band by another node, a current operating channel of the node in the at least one unlicensed frequency band, a previous operating channel in the at least one unlicensed frequency band, a number of channel switches performed in the at least one unlicensed frequency band, and a disabled time interval during which the at least one unlicensed frequency band is not used for transmissions.

14. The apparatus of claim 11, wherein the processor is configured to modify the values of the PM counters to indicate at least one of an overhead time interval for clear channel assessment, a number of times a channel was released prior to an allowed channel occupancy time, a duration of a carrier sense adaptive transmission cycle, and a type of subframe puncturing.

15. The apparatus of claim 11, wherein the processor is configured to modify the values of the PM counters to indicate characteristics of wireless communication according to a first radio access technology (RAT) using the at least one unlicensed frequency band, and wherein modifying the values of the PM counters comprises modifying values of PM counters to indicate at least one of disabling service in the at least one unlicensed frequency band according to the first RAT, enabling service in the at least one unlicensed frequency band according to the first RAT, enabling service in the at least one unlicensed frequency band according to a second RAT, and disabling service in the at least one unlicensed frequency band according to the second RAT.

16. The apparatus of claim 11, wherein the processor is configured to normalize the values of the PM counters over a second time interval, wherein the second time interval corresponds to a time interval for collecting PM counters that indicate characteristics of wireless communication in at least one licensed frequency band or a time interval for collecting PM counters that indicate characteristics of wireless communication in the at least one unlicensed frequency band by another node.

17. The apparatus of claim 16, wherein the processor is configured to normalize the values of the PM counters by modifying the values of the PM counters only during the ON time intervals in which the apparatus is permitted to transmit over the at least one unlicensed frequency band until the sum of the ON time intervals equals the second time interval.

18. An apparatus comprising:
   a transceiver to receive values of performance measurement (PM) counters from a plurality of nodes to indicate characteristics of at least one unlicensed frequency band used by each of the plurality of nodes for wireless communication during a first time interval, wherein the plurality of nodes only modifies the values of the PM counters during ON time intervals in which the plurality of nodes is permitted to transmit over the at least one unlicensed frequency band; and
   a processor configured to aggregate the values of the PM counters for the plurality of nodes and modify a configuration of at least one of the plurality of nodes based on the aggregated values.

19. The apparatus of claim 18, wherein the transceiver is configured to receive values of PM counters from a plurality of nodes in at least one of a cluster or a geographic area.

20. The apparatus of claim 19, wherein the processor is configured to modify the configuration of at least one of the plurality of nodes in the cluster or the geographic area.

21. A non-transitory computer readable medium embodying a set of executable instructions, the set of executable instructions to manipulate at least one processor to:
   modify values of performance measurement (PM) counters in a node to indicate characteristics of at least one unlicensed frequency band used for wireless communication during a first time interval, wherein the node only modifies the values of the PM counters during ON time intervals in which the node is permitted to transmit over the at least one unlicensed frequency band; and
   provide the values of the PM counters to a controller that is configured to aggregate the values of the PM counters for the node with values of PM counters for other nodes.

* * * * *